United States Patent
Marsala et al.

(10) Patent No.: US 11,892,584 B2
(45) Date of Patent: Feb. 6, 2024

(54) MARINE TO BOREHOLE ELECTROMAGNETIC SURVEY

(71) Applicants: SCHLUMBERGER TECHNOLOGY CORPORATION, Sugar Land, TX (US); SAUDI ARABIAN OIL COMPANY, Dhahran (SA)

(72) Inventors: Alberto Marsala, Dhahran (SA); Nestor Herman Cuevas Maldonado, Milan (IT); Andrea Lovatini, Milan (IT); Mohammed Badri, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 328 days.

(21) Appl. No.: 17/296,126

(22) PCT Filed: Nov. 18, 2018

(86) PCT No.: PCT/US2018/062152
§ 371 (c)(1),
(2) Date: May 21, 2021

(87) PCT Pub. No.: WO2020/106286
PCT Pub. Date: May 28, 2020

(65) Prior Publication Data
US 2022/0018242 A1    Jan. 20, 2022

(51) Int. Cl.
*G01V 3/08* (2006.01)
*E21B 49/00* (2006.01)
*G01V 3/12* (2006.01)
*E21B 47/13* (2012.01)

(52) U.S. Cl.
CPC .............. *G01V 3/083* (2013.01); *E21B 47/13* (2020.05); *E21B 49/001* (2013.01); *G01V 3/12* (2013.01)

(58) Field of Classification Search
CPC . G01V 3/08; G01V 3/083; G01V 3/12; G01V 2003/084–086; G01V 1/003; E21B 49/001
See application file for complete search history.

(56) References Cited

U.S. PATENT DOCUMENTS

| | | | |
|---|---|---|---|
| 6,393,363 B1 | 5/2002 | Wilt et al. | |
| 7,565,245 B2 * | 7/2009 | Andreis | G01V 3/083 702/7 |

(Continued)

FOREIGN PATENT DOCUMENTS

WO    2010123696 A2    10/2010

OTHER PUBLICATIONS

Kong et al., "Casing effects in the sea-to-borehole electromagnetic method", Geophysics, vol. 74, No. 5, Sep.-Oct. 2009, pp. F77-F87.

(Continued)

*Primary Examiner* — Feba Pothen
*Assistant Examiner* — James Split
(74) *Attorney, Agent, or Firm* — Jeffrey D. Frantz

(57) ABSTRACT

Methods of marine to borehole measurement may include dispersing one or more borehole receivers in one or more boreholes; distributing one or more marine receivers in marine water at a seabed; immersing an electromagnetic dipole source in the marine water above the seabed; energizing the electromagnetic dipole source; measuring one or more borehole signal measurements using the one or more borehole receivers and one or more seabed signal measurements using the one or more marine receivers; and determining a three-dimensional property distribution of a reservoir of interest by processing the one or more borehole signal measurements and the one or more seabed signal measurements.

22 Claims, 6 Drawing Sheets

(56) References Cited

U.S. PATENT DOCUMENTS

| | | | | |
|---|---|---|---|---|
| 7,574,410 | B2* | 8/2009 | Strack | G01V 3/12 706/21 |
| 7,805,249 | B2* | 9/2010 | Summerfield | G01V 3/083 702/11 |
| 7,852,087 | B2 | 12/2010 | Wilt et al. | |
| 8,188,749 | B2 | 5/2012 | Wilt et al. | |
| 8,265,913 | B2* | 9/2012 | MacGregor | G01V 3/083 703/2 |
| 8,680,866 | B2 | 3/2014 | Marsala et al. | |
| 8,836,336 | B2* | 9/2014 | Campbell | G01V 3/083 324/365 |
| 9,377,552 | B2* | 6/2016 | Hoversten | G01V 3/083 |
| 9,611,736 | B2 | 4/2017 | Marsala et al. | |
| 9,651,700 | B2 | 5/2017 | Marsala et al. | |
| 10,125,586 | B2* | 11/2018 | Balan | E21B 34/06 |
| 10,401,528 | B2 | 9/2019 | Cuevas et al. | |
| 2009/0157320 | A1 | 6/2009 | Abubakar et al. | |
| 2009/0164188 | A1* | 6/2009 | Habashy | E21B 43/00 703/10 |
| 2009/0265111 | A1 | 10/2009 | Helwig et al. | |
| 2010/0250141 | A1 | 9/2010 | Tompkins | |
| 2012/0130641 | A1* | 5/2012 | Morrison | G01V 3/26 702/7 |
| 2012/0268135 | A1 | 10/2012 | Marsala et al. | |
| 2014/0203810 | A1 | 7/2014 | Marsala et al. | |
| 2015/0061683 | A1 | 3/2015 | Marsala et al. | |
| 2016/0154133 | A1* | 6/2016 | Donderici | G01V 1/50 367/12 |
| 2016/0266269 | A1* | 9/2016 | Wilson | G01V 3/30 |

OTHER PUBLICATIONS

Marsala et al., "3D inversion practice for crosswell electromagnetic surveys in horizontal wells in Saudi Arabia", 2015 SEG Annual meeting proceedings, pp. 869-873.

Marsala et al., "Crosswell Electromagnetic Tomography: Resistivity Mapping to Interwell Fluid Distribution", IPTC 12229, International Petroleum Technology Conference, Session: Meeting the Energy Needs of a Growing World Economy, 6 pages.

Search Report and Written Opinion of International Patent Application No. PCT/US2018/062152 dated Jul. 30, 2019; 14 pages.

Wilt et al., "Crosswell Electromagnetic Tomography in Saudi Arabia—From Field Surveys to Resistivity Mapping", 70th EAGE Conference and Exhibition incorporating SPE EUROPEC 2008, Session: Reservoir Monitoring and Management II, 5 pages.

Marsala et al., "Fluid Distribution Inter-Well Mapping in Multiple Reservoirs by Innovative Borehole to Surface Electromagnetic: Survey Design and Field Acquisition", IPTC 17045, International Petroleum Technology Conference, 2013, 4 pages.

Marsala et al., "First Pilot of Borehole to Surface Electromagnetic in Saudi Arabia—A New Technology to Enhance Reservoir Mapping & Monitoring", 73rd EAGE Conference and Exhibition incorporating SPE EUROPEC 2011, 5 pages.

Ali et al., "Constraining Interwell Water Flood Imaging with Geology and Petrophysics: An example from the Middle East", SPE 120558, 2009 SPE Middle East Oil and Gas Show and Conference, 11 pages.

Wilt et al., "Crosswell Electromagnetic Tomography: System Design Considerations and Field Results", Geophysics, vol. 60, No. 3, May-Jun. 1995, pp. 871-885.

Wilt et al., "Using Crosswell Electromagnetic to Map Water Saturation and Formation Structure at Lost Hills", 2001, SPE 68802, Society of Petroleum Engineers, 6 pages.

Liang-Jun et al., "Continuous TDEM for monitoring shale hydraulic fracturing", Applied Geophysics, Chinese Geophysical Society, Heidelberg, vol. 15, No. 1, May 9, 2018, pp. 26-34.

International Preliminary Report on Patentability of International Patent Application No. PCT/US2018/062152 dated Jun. 3, 2021, 10 pages.

* cited by examiner

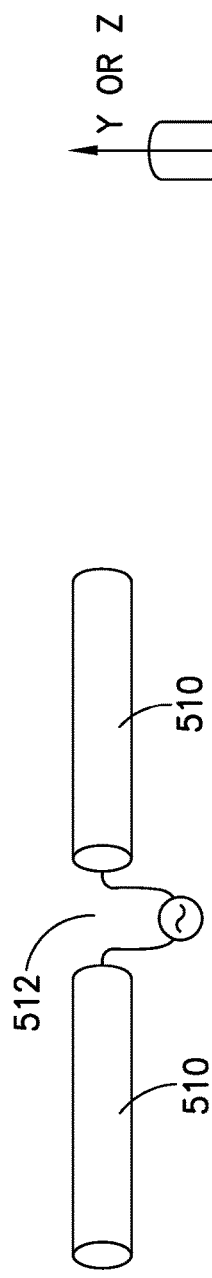
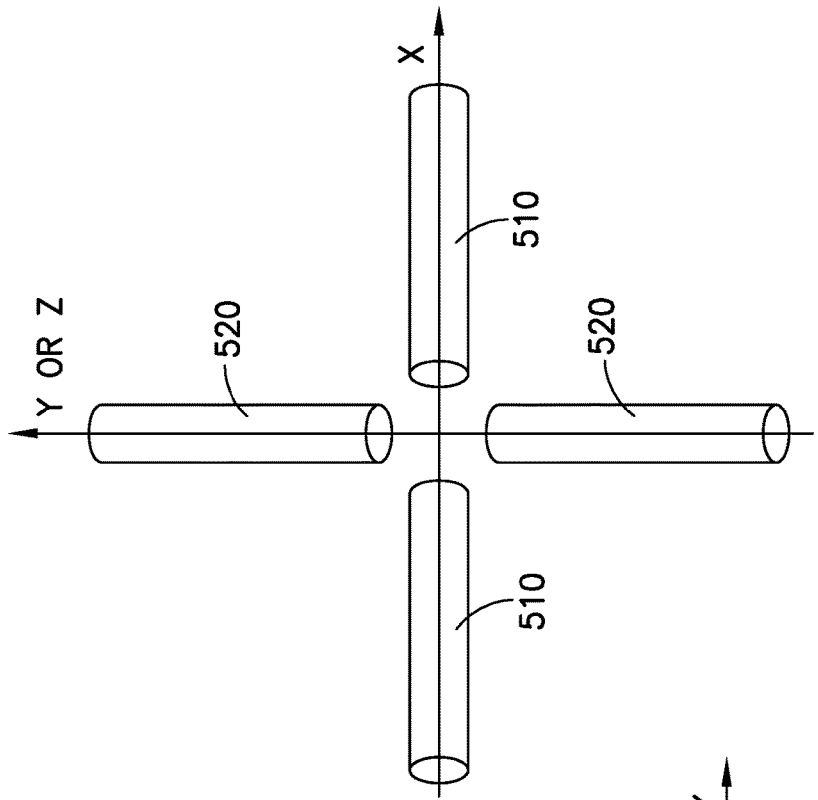
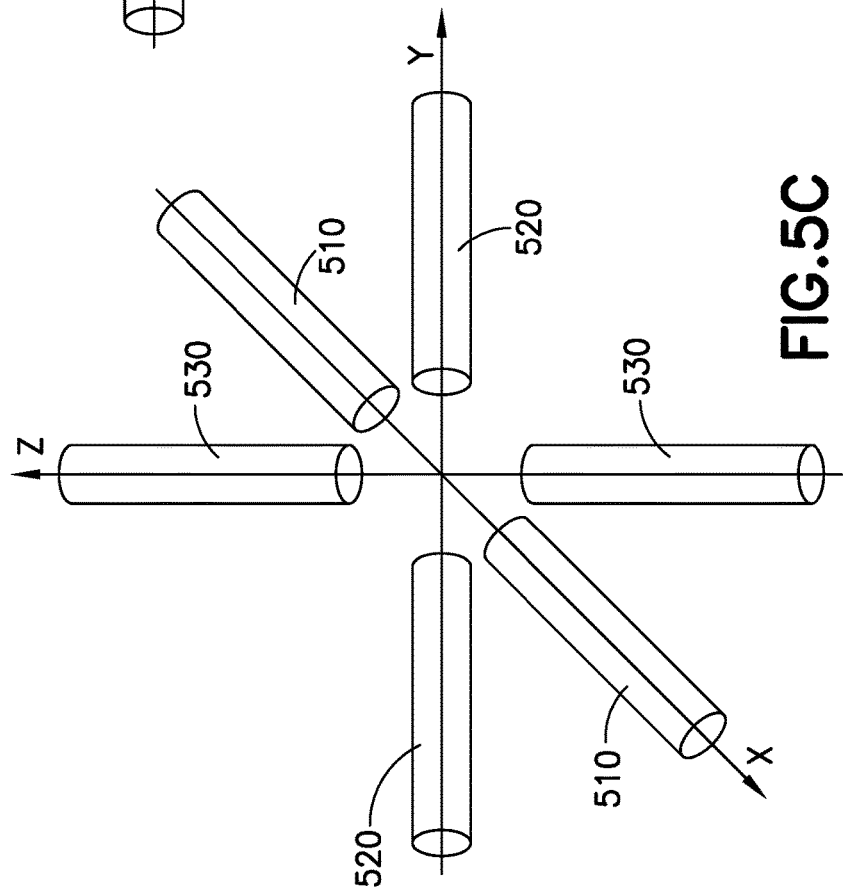

MARINE TO BOREHOLE ELECTROMAGNETIC SURVEY

BACKGROUND

This disclosure relates generally to oil and gas exploration and/or monitoring systems and more specifically to three-dimensional imaging of the earth subsurface.

In the field of petroleum exploration and production the percentage volume of each fluid (oil, water, and gas) in the pore space of reservoir rock is referred to as saturation of each fluid phase. In the exploration phase, saturation provides an indication of the economic potential of a reservoir. When the reservoir enters production, saturation may also be monitored to gauge the production efficiency as a function of time during the life of the reservoir. The measurement and use of fluid saturation further continues during the enhanced recovery period.

During the production phase, the local permeability variations can cause non-uniform saturation distribution and, in some situations, may cause large sections of reservoir to be bypassed or at least less efficiently produced. To map such saturation distributions deep looking techniques, especially techniques based on electromagnetic (EM) techniques, are often used to measure fluid saturation at depths of up to a few kilometers away from the borehole. Such EM techniques are collectively called Deep EM.

Increasing recovery factors, and the associated economic gains, requires an understanding of the spatial distribution and flow dynamics of various fluid interfaces. This understanding is an important factor in supporting reservoir management practices, production optimization, and Enhanced Oil Recovery (EOR) processes. In this context, Deep EM can provide spatial information regarding electrical resistivity distributions within the reservoir, which may then be used to infer fluid saturation at various locations.

Crosswell EM is one of the Deep EM techniques that are offered as a commercial service by SCHLUMBERGER™. The measurement is made by placing an EM source (also called a transmitter antenna) in a primary well and a receiver antenna or array of antennas in one or more secondary wells. The receiver array may include multiple receivers and measure the response of earth formation energized by the EM source at a range of locations simultaneously. The measurement starts with placing the source at a location in the primary well and energizing it. At each source location, the receiver or receiver array in the secondary wells is moved to sequentially different depths and data points are collected. The source is then moved to the next location within the primary well and data collection by the receiver or receiver array is repeated. The distance between the primary and secondary wells is often close enough for the received signal to be measurable in a reasonable time. In most cases, this distance is up to about 2 km. The measurement principle is described, for example, in "Crosshole electromagnetic tomography: System design considerations and field results," Society of Exploration Geophysics, Vol. 60, No. 3, 1995.

An example apparatus for performing Crosswell EM is described in co-owned U.S. Pat. No. 6,393,363, entitled "A Method and Apparatus for The Measurement of The Electrical Resistivity of Geologic Formations Employing Modeling Data", the contents of which are herein incorporated by reference. In the application, the measurement results are inverted to obtain a resistivity image of the space between the two wells which is further processed to convert resistivity to saturation at each point, as described in "Using Crosswell Electromagnetic to Map Water Saturation and Formation Structure at Lost Hills", by M. Wilt et al., 2001 (SPE paper 68802). The authors further describe a qualitative method of estimating the change in water saturation from time-lapse Crosswell EM data by repeating the measurements after the reservoir has been producing for a period of time.

In Crosswell EM methods, downhole magnetic sources directly energize the reservoir fluids between a primary well containing the EM source and one or more secondary wells containing receiving antennas. The earth response measured between the primary and secondary wells enables the generation of 2D tomographic images of the electrical resistivity distributions, which are generally better resolved than those obtained from surface-based methods. However, the deployment of Crosswell EM measurements is not always feasible, as it depends on the availability of at least two wells, with at least one of them open or fiber glass completed in order to obtain suitable measurement signal to noise ratio (SNR).

An extension of Crosswell EM involves the use of a single well technique in which the source is deployed at reservoir depth, while the receiver antenna is located at the surface. Single well Deep EM methods yield three-dimensional (3D) lateral information about the subsurface strata. In this technique, the receivers are not confined to the limited space available in a borehole and they can be deployed over extensive areas on the surface to track the distribution of the oil/water in the reservoir away from the borehole. Previous works have shown that energizing a vertical source extending from the surface down to reservoir depth can provide a useful response in a borehole to surface configuration. In this approach, the source is in the borehole, while the receivers are on the surface to gather EM energy from the borehole. In a borehole to surface configuration, the receivers could be deployed over vast areas, which may provide a description of reservoir properties leading from the borehole on a deeper scale than is possible with Crosswell EM.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, methods in accordance with the present disclosure may include dispersing one or more borehole receivers in one or more boreholes: distributing one or more marine receivers in marine water at a seabed; immersing an electromagnetic dipole source in the marine water above the seabed; energizing the electromagnetic dipole source; measuring one or more borehole signal measurements using the one or more borehole receivers and one or more seabed signal measurements using the one or more marine receivers; and determining a three-dimensional property distribution of a reservoir of interest by processing the one or more borehole signal measurements and the one or more seabed signal measurements.

In another aspect, apparatuses in accordance with the present disclosure may include a marine electromagnetic source; one or more borehole receivers dispersed in one or more borehole locations; one or more marine receivers dispersed in one or more seabed locations; and a processor configured to calculate a three-dimensional property distribution of a reservoir of interest from data received by the one or more borehole receivers and the one or more marine receivers.

In another aspect, methods in accordance with the present disclosure may include providing marine to borehole measurements comprising borehole signal measurements with corresponding depths and seabed signal measurements with corresponding seabed coordinates; using the seabed signal measurements and an inversion to infer electromagnetic parameters of earth subsurface strata intervening between seabed and a reservoir of interest; inverting the borehole signal measurements and the electromagnetic parameters of earth subsurface strata, wherein the electromagnetic parameters of earth subsurface strata are kept constant; and inferring a three-dimensional property distribution of the reservoir of interest from the inverted borehole signal measurements.

Other aspects and advantages of the claimed subject matter will be apparent from the following description and the appended claims.

BRIEF DESCRIPTION OF THE DRAWINGS

The present disclosure is further described in the detailed description which follows, in reference to the noted plurality of drawings by way of non-limiting examples of the present disclosure, in which like reference numerals represent similar parts throughout the several views of the drawings, and wherein:

FIG. 5A is a schematic drawing of single axis electric dipole antenna to be used as a transmitter (source) in marine to borehole (MTB) measurements in accordance with embodiments of the present disclosure;

FIG. 5B is a schematic drawing of a bi-axial electric dipole antenna to be used as a transmitter (source) in MTB measurements in accordance with embodiments of the present disclosure;

FIG. 5C is a schematic drawing of tri-axial electric dipole antenna to be used as a transmitter (source) in MTB measurements in accordance with embodiments of the present disclosure.

DETAILED DESCRIPTION

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details in more detail than is necessary for the fundamental understanding of the present disclosure, the description taken with the drawings making apparent to those skilled in the art how the several forms of the present disclosure may be embodied in practice. Furthermore, like reference numbers and designations in the various drawings indicate like elements.

In one aspect, embodiments of the present disclosure relate to the acquisition and processing of marine to borehole (MTB) electromagnetic data. In another aspect, embodiments of the present disclosure relate to equipment that may be used to acquire such data. In one or more embodiments, MTB EM emitted from one or more submersible electromagnetic sources deployed in a marine environment and one or more receivers positioned in a borehole, terrestrial surface, or marine surface. In one or more embodiments, the receivers may gather data for formation regions between the EM source and the respective receivers. For example, marine receivers may be positioned at the sea floor to gather data pertinent to the subsurface regions of interest intervening between the marine layer and the EM source. Because the EM waves propagate from marine environment to well borehole, where borehole receivers are located, the method is referred to as marine to borehole (MTB).

Figure 1:
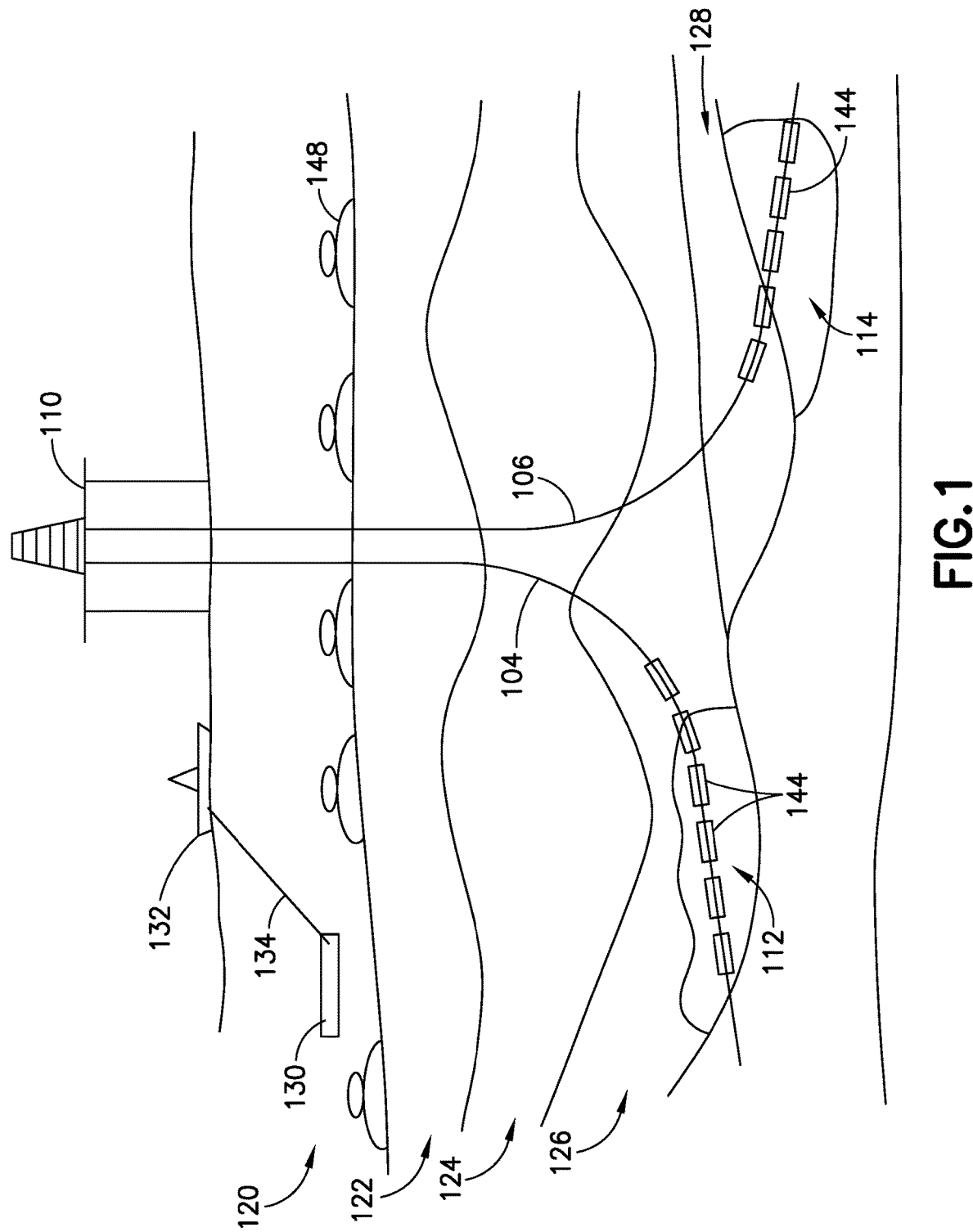
FIG. 1 is a projected view of a marine layer and an apparatus to perform the marine to borehole measurement in accordance with embodiments of the present disclosure.

FIG. 1 is a projected view of a marine wellbore operation and an apparatus to perform the marine to borehole measurement. The marine water environment 120 is shown in which an offshore platform 110 is positioned for oil exploration, reservoir development and petroleum production. Multiple wells 104 and 106 have been drilled from the platform 110 into the earth, traversing the subsurface strata 122, 124, 126, and 128. Well 104 passes through subsurface strata 122, 124, and 126 to reach the reservoir of interest 112. The earth above the reservoir 112 up to the marine water environment 120 may be referred to as overburden. The overburden may include many geological formations and is not limited by the four subsurface strata shown in FIG. 1. Well 106 extends from platform 110 and traverses reservoir 114. The wells 104 and 106, being drilled from the same platform, are near to each other before they change direction towards different reservoirs.

It is worth noting that FIG. 1 is a cross sectional view of several subsurface strata and is not reflective of the geometry outside this plane. In general, both the geometry and formation properties may vary in three dimensions from point to point in each stratum. The reservoir of interest 112, as well as many earth subsurface strata, have complex distributions of petrophysical, and electromagnetic properties. Reasons for the variation may include heterogeneity in factors such as porosity, fluid permeability, and fluid saturation. As such, reservoirs such as 112 may be considered a 3D distribution of petrophysical and electromagnetic parameters.

In one aspect, embodiments of the present disclosure are directed to characterizing the complex properties of a reservoir in a 3D property image. Returning to FIG. 1, a marine submersible EM source 130 (also referred to as transmitter) is shown immersed in the marine layer 120. The source 130 is attached to and is towed by a marine vessel 132 through a cable 134. In some embodiments, the marine EM source 130 may be electrically and mechanically connected to a marine vessel 132, where the marine vessel is equipped to excite and drag the electromagnetic source immersed in marine water.

In addition to mechanical towing, the cable 134 provides electrical connections to the source 130, which may include power delivery and any diagnostics and command lines needed to communicate and operate the source 130. The source 130 may be immersed at some depth below the surface of marine water layer 120. Deployment of marine sources and receivers has been used successfully to monitor and characterize shallower reservoirs located below the marine water. However, as the depth of target reservoir of interest increases, the spatial resolution of measurement decreases so that marine measurements alone are not suitable for determining the 3D property image of deeper lying reservoirs. The resolution loss is largely attributed to the diffusive behavior of EM fields at lower frequencies (1,000 Hz) that are normally used for Deep EM.

Also shown in FIG. 1 are borehole receiver arrays 144 located in wells 104 and 106 respectively. Borehole receiver arrays 144 are composed of multiple receiver antennas capable of measuring the EM signal at its location. In one or more embodiments, the number of receiver antennas and the spacing between them in the array may vary and may be chosen such that the length of array covers at least a part of the borehole passing though the reservoir of interest. In some embodiments, the length of receiver array is long enough to extend passed the reservoir and span a part of the adjacent earth subsurface strata. For thinner reservoirs, the length of the receiver array may be configured to be relatively shorter by reducing the number of receiver antennas or by positioning the antennas closer together in the array. During measurement, source 130 is energized and the borehole receiver arrays 144 measure the EM signal at the position of each receiver antenna within the array generating one or more data points. In one or more embodiments, the number of data points may be increased by increasing the number of receiver antennas in the array.

Additionally, one or more marine receiver arrays 148 may be deployed on the bottom of marine water 120, on top of the overburden. When the source 130 is energized, each marine receiver array 148 measures an EM signal induced in the earth and available at the location the receiver is deployed. As discussed below, these seabed signals received by the marine receiver arrays 148 are used to calculate electromagnetic properties of earth strata in the overburden.

In one or more embodiments, the positions of the borehole and marine receivers are selected based on pre-operation modeling studies. In some embodiments, pre-operation modeling studies may be performed prior to the deployment and measurement operation.

In one or more embodiments, borehole receiver arrays in accordance with the present disclosure may be deployed within a well using different conveyance techniques that may include wireline, slick line, coil tubing, drill collar, downhole tractor, and the like. If a well is substantially vertical, for example, wireline may be used as a mode of conveyance to deliver the borehole receiver array(s) to a proper depth in the well, in addition to providing power, communication, and control lines that may be used to initiate measurement and telemeter the measured data to the surface location. In some embodiments, particularly where a well is highly deviated and horizontal wells, borehole receivers may be emplaced by wireline, slick line, coil tubing, drill collar, or downhole tractor. In some embodiments, receiver arrays may be equipped to operate using battery power and store data locally, such as when there is no direct power or communication from the surface.

In one or more embodiments, marine receiver arrays 148 may be deployed to the bottom of the marine water layer 120 using the force of gravity. Marine receivers in accordance with the present disclosure may be connected to the marine vessel 132 by electrically insulated wires for power, communication, and data transfer. In some embodiments, marine receiver arrays may be equipped to operate using battery power and store data locally, such as when there is no direct power or communication from the surface.

Once the source and all receiver arrays are in place the measurement is performed. The EM source 130 is energized by providing EM current through the cable 134 causing it to radiate EM waves. In one or more embodiments, the EM current may be in a frequency domain or time domain. The EM waves propagate through the marine layer and earth medium presenting a signal at all locations. In downhole locations, in one or multiple boreholes (104 and 106, for example), the borehole receiver arrays 144 measure signals, referred to here as borehole signals. The borehole signal is measured by each receiver in the array, for each source position, leading to a plurality of borehole signal data points. In addition, marine receivers within the marine receiver arrays 148 measure an earth response at the respective location on the seabed, which is then collected as seabed signal data points.

Methods in accordance with the present disclosure may utilize a pre-operation modeling study that uses a model of the earth formation (earth model) along with other information that may include source locations, receiver antenna locations, antenna sensitivity, and EM power delivered to the electromagnetic source to calculate an expected received signal by each receiver. In one or more embodiments, the earth model may account for the EM wave propagation and any reflections from the discontinuities in the earth, such as bed boundaries and other geological features. In some embodiments, the model may also include the depth of source from the marine surface and the depth of marine water layer 120. To account for earth subsurface strata below the marine water layer 120, the earth model incorporates structure from the subsurface strata such as bed thickness, tilt, as well as the electromagnetic parameters such as resistivity, EM anisotropy, and the like. Subsurface data may be obtained from well log data obtained by conventional logging tools in some embodiments but may only be valid for the near wellbore area. Seismic data may also be used in some embodiments to provide information for greater distances from the borehole regarding formation geometry and structural heterogeneity, however, seismic data does not provide information about the EM-related properties.

Figure 2:
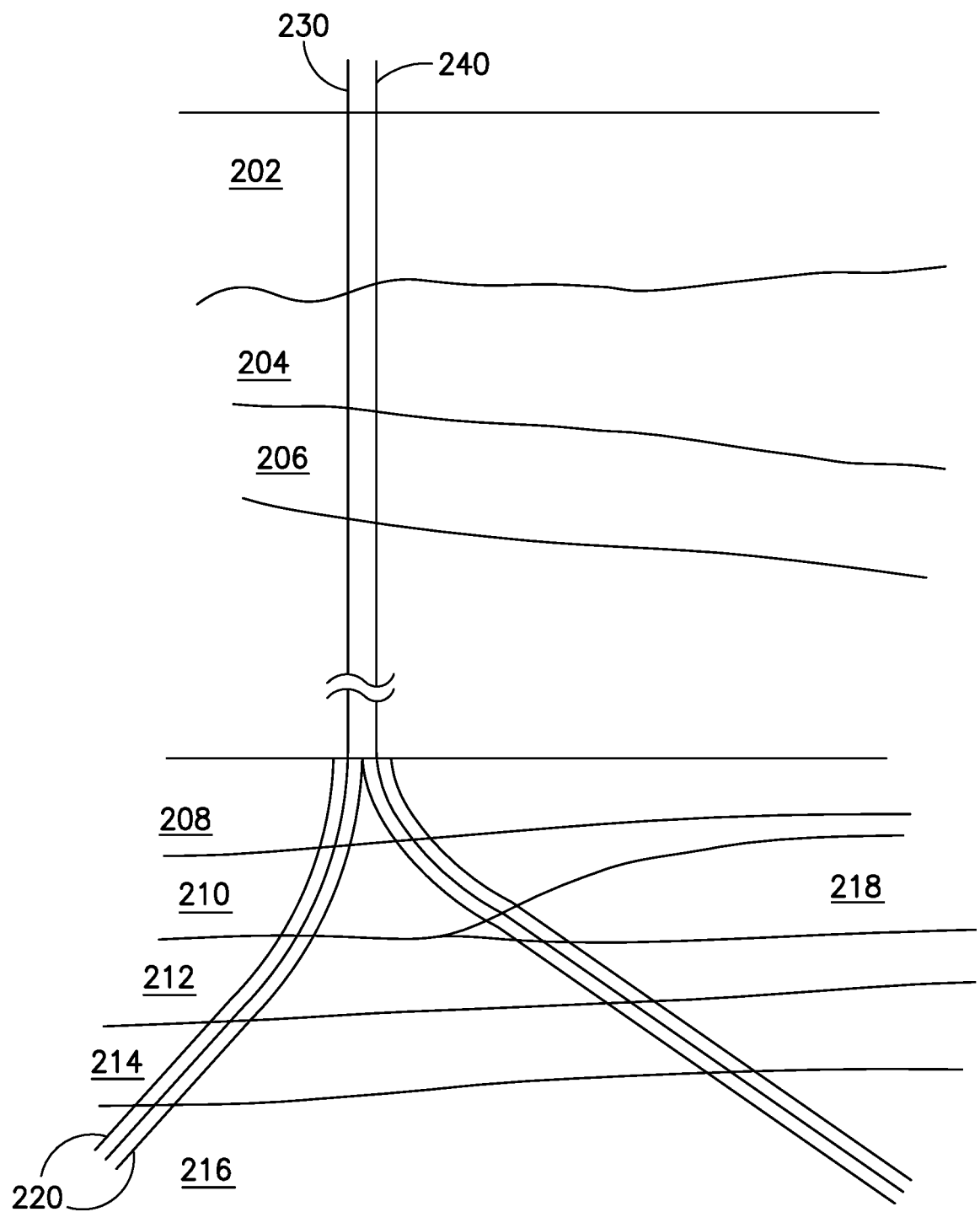
FIG. 2 is a cross-sectional view of the earth layer showing how conventional well logs, seismic, and logs that are run in an adjacent well are used to estimate initial values for the electromagnetic parameters and geometry of earth layers in accordance with embodiments of the present disclosure.

FIG. 2 shows an example scenario where wells 230 and 240 are drilled from a platform in the marine water layer 202 and passes the earth subsurface strata 204, 206, 208, 210, 212, 214, and 216. The boundaries 220 around well 230 show the distance from the well borehole where the data from conventional logs is valid which is too small for Deep EM purposes. In this particular example, the stratum 218 does not intersect with the well 230 and is unlikely to be detected by conventional logging techniques. However, the bed 218 may be detected from well 230 by seismic measurements, which may provide limited information regarding geometrical parameters, but not EM-related properties. Nearby well 240 drilled from the same platform intersects with strata 210 and 218 and conventional logs measured in well 240 provide information regarding the thickness and electromagnetic properties of strata 210 and 218. If well 240 does not exist or it does not intersect with 218, approximate values may be used for the electromagnetic properties of stratum 218.

In the next step, the initial EM properties and the earth geometries are input to a computer-based model that calculates the signal level at each receiver location as a function of source locations. In one or more embodiments, the model generated from the receiver signal location may be used to define the optimum boundaries and depth(s) of a two-dimensional horizontal plane that represents a projected collection region for a marine submersible EM source to maximize receiver data collection.

MTB measurements are convenient logistically because a marine EM source can be towed continuously and at a desired speed. During measurement, a marine EM source may operate continuously and may be transported to a second location following measurement at a first location. Continuous measurement may lead to smoother and denser source signal intensity reaching receiver locations in which data is measured. In one or more embodiments, the shortest distance between consecutive measurements is controlled by the time it takes for the receivers to record the data and the speed at which the source is moved which is well under control by the marine vessel speed. In some embodiments, the source may be stopped at discrete locations where the measurements are performed before moving the source to the next location, which may increase data resolution at the expense of increased data acquisition time.

Figure 3A:
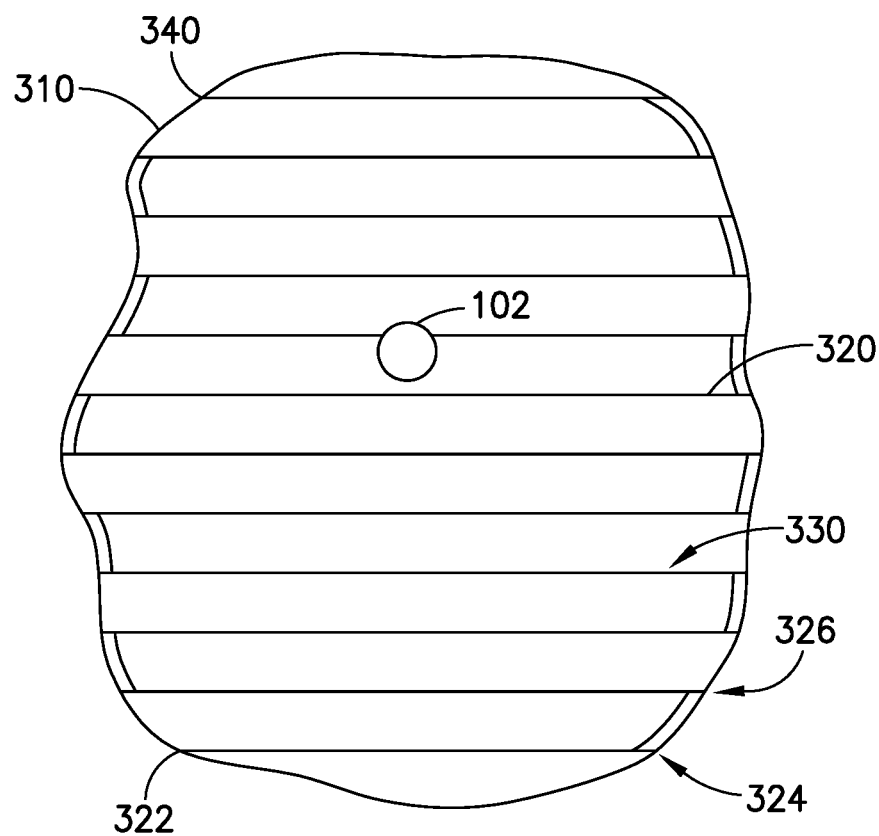
FIG. 3A is a drawing of a two-dimensional plane within the marine water in which the electromagnetic source is transported in a linear path in accordance with embodiments of the present disclosure.
Figure 3B:
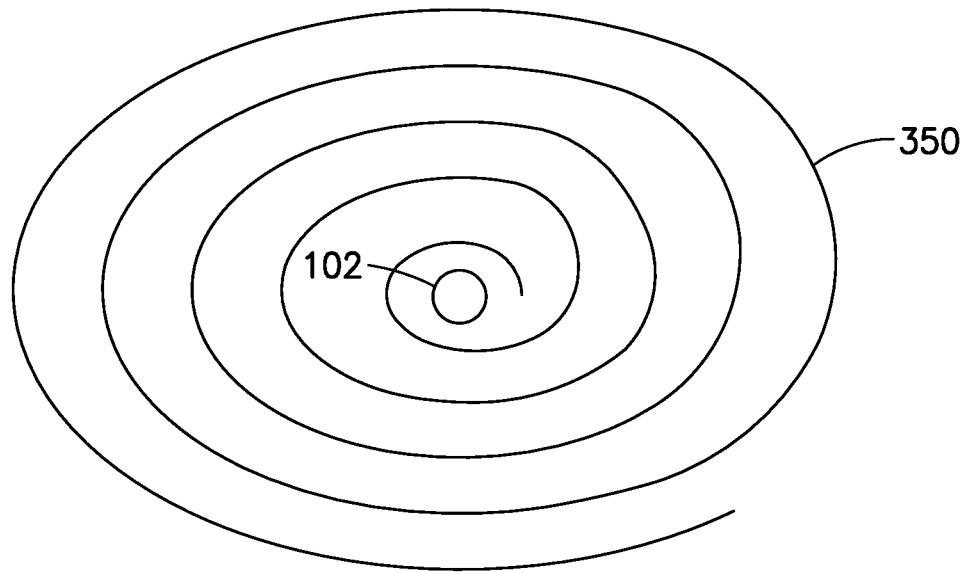
FIG. 3B is a drawing of a two-dimensional plane within the marine water in which the electromagnetic source is transported in a spiral path in accordance with embodiments of the present disclosure.

In FIGS. 3A and 3B, projected travel paths for a marine EM source during a MTB measurement in accordance with the present disclosure are shown, as based on the generated two-dimensional horizontal plane. With respect to FIG. 3A, a top view of a two-dimensional horizontal plane generated in accordance with methods of the present disclosure is shown. During computer modeling, the position of source from the platform 102 is increased while monitoring the signal to noise ratio (SNR) of signal at borehole receivers, where signal intensity is inversely proportional at further distances from the EM. In one or more embodiments, a model may incorporate presets that are based on SNR. For example, a preset SNR may be established based on a distance from the EM source at which the signal is below a workable SNR. The SNR preset may be used to define boundary point 320. Repeating the same study in different directions, horizontal plane 310 may be mapped for based on a central reservoir source 102 and available receiver array locations. If desired, studies may be repeated by varying the borehole receiver array design (e.g., size, receiver number, inter-receiver distance, and the like) to provide the optimum receiver array locations and number.

In FIG. 3A, travel paths for a marine EM source are designed in straight path crisscross grid 330. Marine EM source travel paths may be parallel in some embodiments, and in some embodiments where the source is unidirectional, they may be repeated in perpendicular directions. In the embodiment shown in FIG. 3A, the antenna is transported in two substantially perpendicular directions to form a path resembling a rectangular grid (grid path). In this case, the source is transported in a first set of paths and then measurements are repeated in a second, perpendicular set of paths. Methods incorporating a grid path may be particularly useful when the source is unidirectional and dragging it in two orientations leads to more independent measurements. FIG. 3B depicts a further embodiment in which a marine EM source travel path is executed in a spiral path 350 that covers the same horizontal plane. The present disclosure contemplates any combinations of these and other dragging paths.

In one or more embodiments, measurements may continue while the marine EM source is transported along the projected travel path. In FIG. 3A, the source may start at location 322 and be transported in the direction of location 324, at which point the marine vessel changes direction and moves to point 326 from which it continues in the opposite direction without having to stop. This continues until the marine vessel reaches location 340 and covers the entire two-dimensional plane 310. Variations in speed may also be minimized by introducing curved elements into the travel path. For example, in the spiral path embodiment of FIG. 3B, there is no need for the marine vessel to make large path changes as the path naturally lends itself to a continuous and smooth travel.

Methods of MTB measurement in accordance with the present disclosure may avoid the common problems of data undersampling near the transmitter location by increasing the number of source positions surveyed per measurement.

Knowing the impedance of medium close to the antenna allows the source to be designed to be impedance matched to the water conductivity causing close to perfect coupling between the source antenna and the surrounding medium. The proper impedance match causes most of the EM wave energy to couple to the marine water layer and be transmitted instead of being reflected back to the source. The high intensity broadcasted EM wave, couples to the earth strata beneath the marine level and propagates to the reservoir of interest which in turn increases the signal to noise ratio of both borehole receivers and marine receivers. Because the marine EM source used in embodiments of the present disclosure is immersed in conductive sea water (which often has an electrical conductivity around 5 S/m), the impedance surrounding the source is well-defined, constant, and accessible for measurement. In some embodiments, methods may assume that sea water is a constant that is approximately 5 S/m.

In one or more embodiments, the measured data at each receiver location is repeated and signal averaged to reach a target SNR. In some embodiments, EM wave coupling between the marine EM source and the surrounding sea water may result in higher measured signal levels and a minimization or elimination of a need for repeated measurements to achieve a targeted SNR. The improved SNR permits the marine EM source to be transported further away from the target well in the reservoir of interest and receivers, which enables the survey area traveled by the marine EM source to be increased and may translate to the creation of a deeper map of reservoir EM properties.

In one or more embodiments, the marine EM source transport speed by marine vessel 132 may be optimized for the given application. At high transport speeds, rapid source movement may obscure the location of the source as receivers are making measurements. In contrast, at low transport speed, source movement may be slower than receiver data acquisition time, which leads to idle time as the source reaches the next set location without added benefit. Optimization methods in accordance with the present disclosure may include selecting a target SNR, the signal level of an individual measurement, and the length of time for each measurement. With these factors the time required to make a reliable measurement may be determined, which may then be converted to an optimized transport speed for the marine EM source. In some embodiments, the marine EM source transport speed may vary in one or more areas of the measurement plane. For example, in locations close to the well head, the EM source and borehole receiver array are closer to each other causing the borehole signal to be stronger so that the marine vessel speed can be set faster. In contrast, far away from the well head and close to the boundaries of the two-dimensional measurement plane, the signal becomes weaker and the source may need to be transported slower.

The measurements obtained by a marine receiver array 148 may be used to generate one or more seabed signal data points from signals intercepted from EM source 130. This transmitter-receiver combination is used in a control source EM (CSEM) measurement. In CSEM, the EM wave broadcasted from the EM source travels through the earth strata below the sea floor and propagates down until it reaches a bed boundary with different EM properties. Part of the EM energy is reflected at the bed boundary and propagates back to the sea floor where it is measured by the marine receivers in array 148. The remaining part of EM continues to propagate lower until it encounters the next bed boundary at which point it gets reflected and eventually detected by the marine receivers. The propagation-reflection-propagation steps continue until the EM energy level falls below the detectable limit of the seafloor receivers. The measured data can be modeled and interpreted to obtain the resistivity and geometry of earth strata lying below the sea floor. CSEM is typically used before initiating a drilling operation and has been shown to be able to detect shallower reservoirs. Once these reservoirs are detected the drilling can commence.

Referring again to FIG. 1, the received signals by the marine receiver array 148 is a CSEM response. In one or more embodiments, this signal alone can be processed to obtain a resistivity distribution of the earth lying below the seafloor down to the reservoir depth. In some embodiments, an EM forward model accounting for the geometries and antennas is used iteratively to invert the CSEM response. Forward models in accordance with the present disclosure may provide a modeled seabed signal using initial EM properties and geometries of subsurface strata (collectively referred to as inversion parameters). In an inversion routine, the modeled seabed signals are compared with the actual measured data and the difference is used to update the inversion parameters, which are used in the forward model again. This process is repeated iteratively until a conversion is reached.

Following inversion of the CSEM response, the final inversion parameters provide enhanced agreement between the modeled and measured seabed signals and may be taken as the EM properties and geometries of earth below the seafloor. These steps are outlined in FIG. 4. In step 410, the forward model is populated by the data obtained from one or more data sources including conventional log responses, seismic maps, data from any adjacent wells, and the like. The forward model is run in step 414 to produce modeled seabed signals. In step 416 modeled seabed signals are compared with the measured data and a difference is calculated. In step 420, the difference is compared with the conversion criteria. If the difference does not meet the conversion criteria, inversion parameters of the earth strata may be adjusted in step 424 and returned to step 410. This procedure may be repeated until conversion is reached in step 420. The latest EM properties and geometries are recorded as the parameters that best reproduce the measured seabed signal data.

Figure 4:
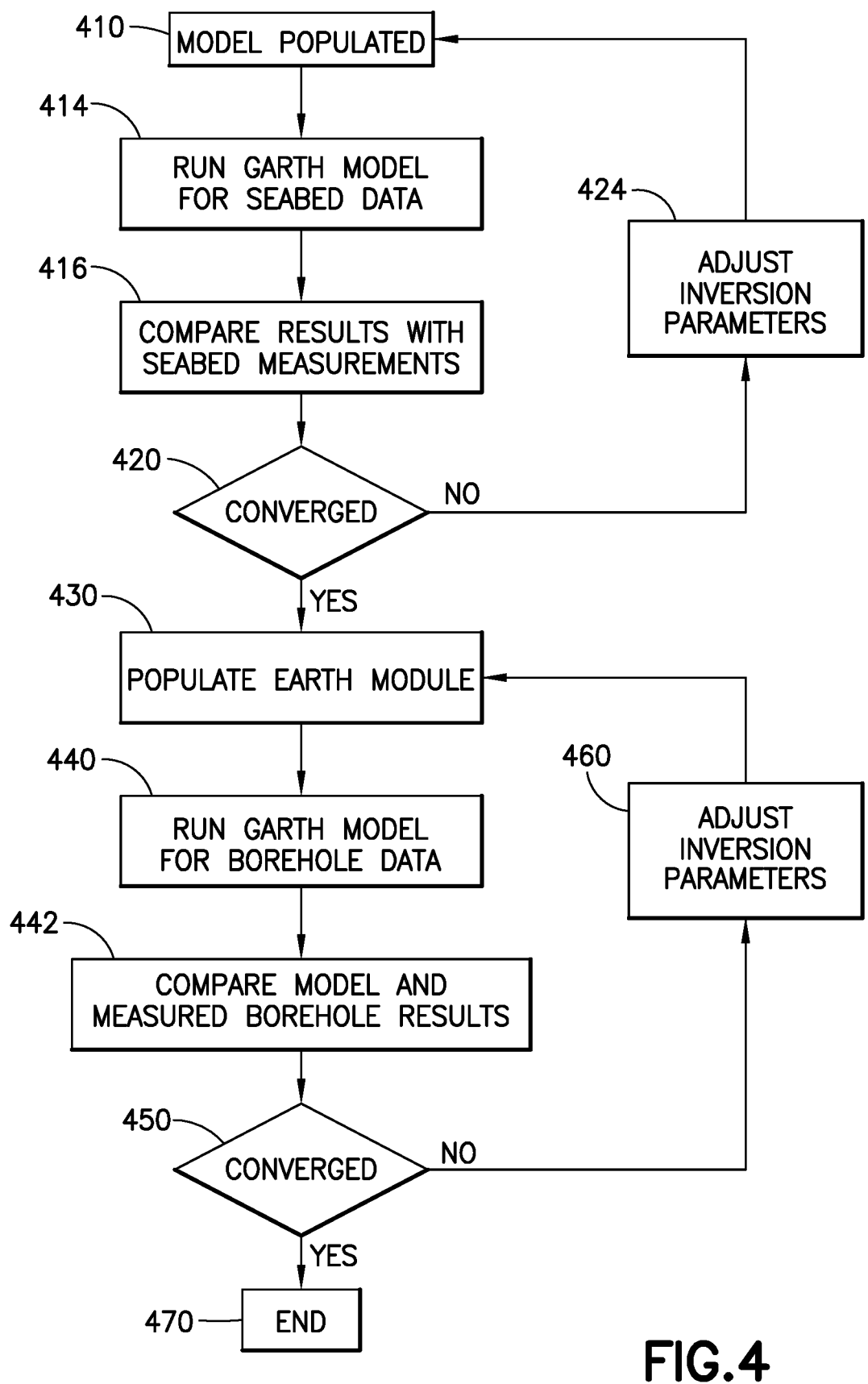
FIG. 4 is a workflow showing a first and second stage inversion for seabed signal and borehole signal in accordance with embodiments of the present disclosure.

The CSEM derived EM parameters and geometries from step 420 may be used as a priori input to step 430, which is the first step for processing the borehole signal data. This part of inversion is focused on obtaining optimum 3D EM property distribution of the reservoir of interest. The CSEM parameters are frozen in step 430 while the EM parameters and geometry of the reservoir of interest can vary iteratively as shown in FIG. 4. The forward model is then run in step 440, leading to modeled borehole signal. In step 442, the modeled and measured borehole signals are compared, and a difference is calculated. In step 450, the calculated difference is compared with convergence condition. If convergence is not reached, latest parameters are modified in step 460 and returned to step 430. These steps are repeated iteratively until convergence is reached in step 450 and the latest parameters are forwarded to step 470.

Different approaches are available to express the geometry of subsurface strata in an inversion routine. In one approach, the EM properties of a formation are assumed not to vary from point to point within the same earth formation. With this approximation, the subsurface strata are treated as having effectively uniform parameters at all points in the medium, and the inversion result is the effective medium EM properties of the formation. This approach ignores variations in the EM properties that invariably exist within the same formation and instead the inversion searches for an average value for these properties. In another approach, the earth stratum is subdivided into smaller spatial units, usually cubes, and the inversion attempts to find the EM properties of each small spatial unit. In a 2D geometry each small spatial unit is called a pixel while in 3D geometries the spatial units are called voxels. With this approach, the number of variables to be inverted are multiplied by at least the number of spatial units. As a result, to perform the inversion requires more independent measurements compared to the effective medium approach. Depending on the application, the approach may be selected with consideration of available independent measurements and computing power, and the level of detail required about the formation.

In one or more embodiments, the forward model in step 410 of FIG. 4 treats the geometry of each intervening formation as an effective medium and proceeds with the inversion. If there are enough seabed signal data points available, some or all the intervening formations may be subdivided into smaller spatial units and inverted. A larger number of seabed measurements may require a deployment of a larger number of marine receivers which may be possible if the detailed EM parameters of an intervening earth strata are desired and contemplated at the time when the seabed receivers are deployed.

For the reservoir of interest, a layer may be subdivided into smaller spatial units. Methods in accordance with the present disclosure that consider smaller units may enable higher measurement resolution, which may be used to identify bypassed zones in the reservoir of interest. Accordingly, in step 430, the petroleum bearing reservoir of interest is subdivided into three-dimensional spatial units (voxels or cubes) and the inversion is performed to obtain the EM properties of each special unit. The maximum number of special units that can be inverted for is determined by the number of independent measured data points and the number of unknown parameters. A higher number of MTB measurements allow the space to be divided into more special units with smaller dimensions. As the inversion provides formation properties at smaller voxels, MTB measurement has proportionally higher resolution. The outcome of the inversion is a three-dimensional EM property distribution of a reservoir of interest. In a further embodiment, depending on the objective of measurement, it may be sufficient to use the effective medium approach for the reservoir of interest. In this case, step 430 treats the reservoir of interest as an effective medium. The present disclosure is not limited to any particular type of inversion approach and all existing inversion approaches are contemplated by this disclosure.

Other approaches may be used for further enhancing the quality and resolution of inversion results. In one or more embodiments, measurements of the fields excited in a Crosswell EM configuration may exist. Because these measurements have higher resolution, they can also be added to the processing step of MTB data, providing added constraints and a priori information about the 3D EM property distribution. In a further embodiment, a method is provided to simultaneously invert both the data sets recorded downhole and on the seafloor for the EM property of overburden and the 3D EM property distribution of the reservoir of interest.

Once a 3D EM property distribution of the reservoir is determined, it can be interpreted to learn about the fluid volume distribution in the pore space of the reservoir. Higher resistivity values are known to be associated with less water and thus more hydrocarbon. In one or more embodiments, a colored 3D resistivity distribution (or equivalent 3D conductivity distribution), which is a subset of 3D EM property distribution, provides a quick impression of locations where more oil may exist. The 3D resistivity distribution is quantitatively interpreted when values of each voxel is converted to an average saturation within the voxel; converting a 3D resistivity distribution to a 3D saturation distribution. To perform this conversion a relationship between the rock resistivity and water content (water saturation) is needed. In petrophysics, this relation is provided by Archie's law, among others, which can be used to transform the resistivity to water saturation at each voxel. The water and hydrocarbon (oil and gas) saturations are related as, by definition, their sum is unity. Thus, the hydrocarbon saturation in each pixel is easily derived from the water saturation at the same voxel leading to a 3D hydrocarbon saturation distribution.

Methods in accordance with the present disclosure may include one or more of: 1) displaying and/or recording the 3D EM properties distribution of the subsurface area, 2) identifying a hydrocarbon deposit within the subsurface stratum using the electromagnetic properties, 3) displaying and/or recording the 3D fluid saturation distribution of the subsurface stratum of interest, and 4) identifying a hydrocarbon deposit within the subsurface stratum using the 3D saturation distribution of the subsurface area. Methods may also include using 3D EM property distributions to design a drilling operation or secondary recovery operation.

In situations where the reservoir has been producing by water injection, there should not be any gas left in the pore space of the formation. In this case, the hydrocarbon saturation may be assumed as equivalent to oil saturation and it can be interpreted accordingly. In one or more embodiments, a heat map of oil saturation may be produced from the inversion data that helps emphasize the zones in which the oil saturation is higher than average, indicating zones where the hydrocarbon is substantially bypassed. In one or more embodiments, inversion data may be used by a reservoir engineer to devise a strategy for drilling and constructing new wells or remedial action to extract hydrocarbons from bypassed zones, for example, by drilling new wells, modifying secondary recovery techniques, and the like.

The 3D EM property distributions generated by methods in accordance with the present disclosure include formation resistivity and other electromagnetic properties of a reservoir such as induced polarization. For example, the data acquired during MTB measurement includes information on induced polarization. In one or more embodiments, the forward model can be generalized to account for the induced polarization in the MTB measurement, and other effects as well. The induced polarization may then be processed by an inversion routine described above to calculate the 3D induced polarization distribution of the reservoir. Similarly, other properties such as anisotropy distribution characterized by MTB measurements may be converted to 3D distributions of the reservoir. In one or more embodiments, 3D distributions may include a three-dimensional electromagnetic property distribution, three-dimensional resistivity distribution, three-dimensional induced polarization distribution, three-dimensional anisotropy distribution, three-dimensional saturation distribution, three-dimensional fracture distribution, three-dimensional permeability distribution, three-dimensional pore pressure distribution, three-dimensional hydraulic boundary distribution, three-dimensional trapped fluids distribution, and the like.

In one or more embodiments, the marine EM source 130 can be an electric dipole or a magnetic dipole. FIG. 5A shows an embodiment of an electric dipole antenna that may be used in CESM measurements in accordance with the present disclosure. In the dipole antenna, two conductive (metallic) bars 510 are shown in line with each other, while a gap 512 in the center serves to electrically isolate the two bars and is the location of the EM emission when electrical current is provided to the source. In a further embodiment shown in FIG. 5B, a two-dimensional electric dipole is made of two bars 510 aligned with an X-axis while two other bars 520 are aligned with Y or Z-axis. In yet another embodiment shown in FIG. 5C, three mutually perpendicular electric dipoles are aligned with the X, Y, and Z-axes. The tri-axial electric dipole antenna of FIG. 5C includes two bars 510 along the X-axis, two bars 520 along the Y-axis, and two bars 530 along the Z-axis. Electric dipoles in accordance with the present disclosure may be configured to withstand the high EM currents available in marine environments. In some embodiments, EM sources may be powered with currents of up to 10,000 Amperes or more to excite the source antenna.

In embodiments in which multiple electric dipole antennas of FIGS. 5B and 5C are used, the dipole antennas may be energized independently, where each dipole antenna acts as an independent transmitter, increasing the number of borehole signal and seabed signal data sets. Multiple dipole antennas may be multidirectional, in contrast with electric dipoles sources in borehole applications, where any electric dipole having a length larger than the borehole diameter can only be unidirectional and oriented along the axis of the well. Thus, the electric dipole for borehole applications may often be a one-dimensional antenna.

Figure 6:
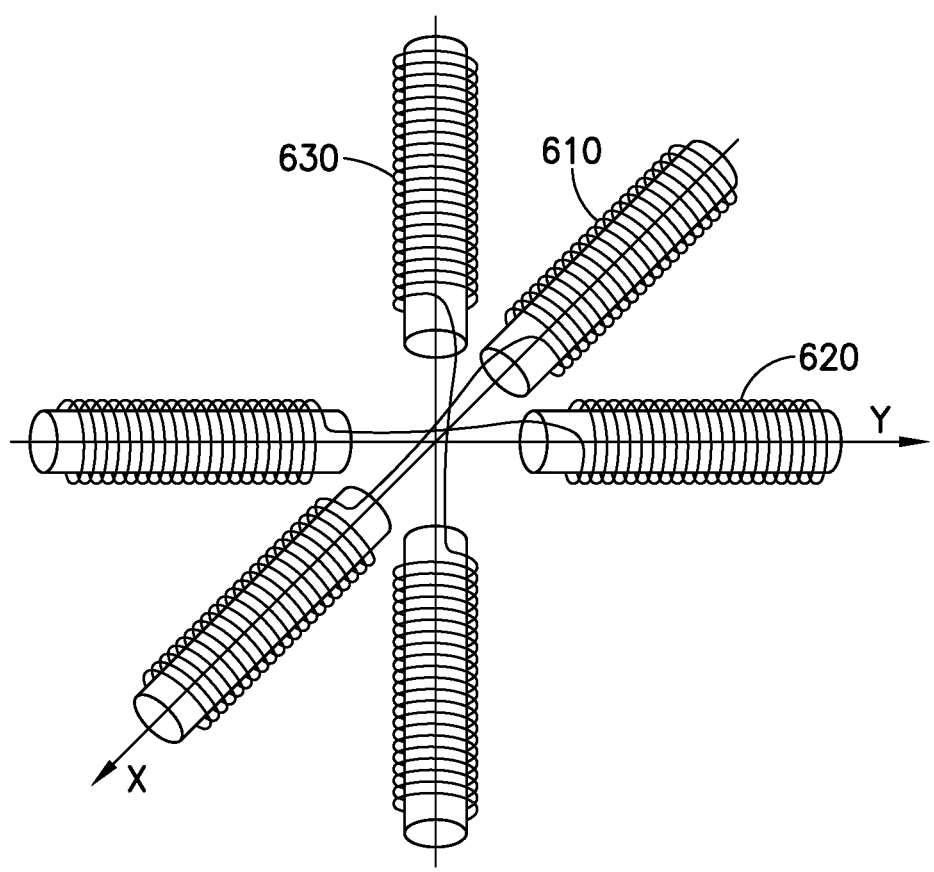
FIG. 6 is a schematic drawing of a tri-axial magnetic dipole antenna to be used as a source in MTB measurements in accordance with embodiments of the present disclosure.

In one or more embodiments, magnetic dipoles may be used as sources for MTB measurement. These antennas are wound around a magnetic core of high magnetic permeability. The number of windings is optimized for the antenna to have high efficiency and strong coupling to the marine water. In an embodiment, shown in FIG. 6, the magnetic dipoles are made in three perpendicular directions and can be used to generate correspondingly more measured data. The windings 610, 620, and 630 use relatively thick wires enabling the antenna to handle high EM currents.

In one or more embodiments, both electric and magnetic fields may be measured by the receivers located in the borehole and seabed. The borehole receiver arrays (such as 144 shown in FIG. 1) may be made up of many receiver (antennas), which may contain in some embodiments, up to 1000 receivers. During measurement, receiving sensors inside a wellbore may measure some or all of the components of the electric field tensor, as well as magnetic field tensor in some embodiments. Receiving sensors in accordance with the present disclosure may be selected from electrode contact dipoles, coils, and capacitive sensors of any kind as deemed appropriate for the specific operating conditions.

In one or more embodiments, the borehole receivers are magnetic field detectors and magnetic dipole antennas are used as receivers. In their simplest design, magnetic dipole antennas are made by winding many turns and are designed to fit in the confined space of a borehole. In some embodiments, magnetic dipole antennas are made with thin magnet wires and are available as tri-axial antennas oriented along perpendicular axes that define a local Cartesian coordinate system. Tri-axial antennas may be preferable to single axis antennas for some applications because they are sensitive to different components of the EM field and provide more detailed information which helps with inversion and increases the measurement resolution. In some embodiments, electric dipole receivers are used in the borehole, such as an electric dipole receiver oriented in the direction of the well.

In one or more embodiments, borehole receiver arrays may be placed in the borehole as part of a permanent or semi-permanent wellbore completion. Receiver arrays in accordance with the present disclosure may use power and telemetry cables of their own or they may share with other completion components. In some embodiments, deployment facilities may repeat the MTB measurement at later times in a wellbore operation and with receivers already in the borehole, to obviate the need for a rig for receiver conveyance during each repeat measurement, which saves time and effort for time lapse measurements. For example, methods in accordance with the present disclosure may include measuring the three-dimensional property distribution at one or more time-points to establish a time lapse three-dimensional property distribution. In some embodiments, the time lapse three-dimensional property distribution may be used to infer a three-dimensional distribution selected from a three-dimensional relative permeability distribution or a three-dimensional fracture conductivity distribution.

Time lapse 3D EM property distribution measurements in accordance with the present disclosure may include information for 3D resistivity and 3D saturation distributions as a function of time and can be interpreted to obtain a wealth of information about the fluid flow in the reservoir of interest. The time dependent 3D saturation distributions can be converted to 3D permeability distribution of the reservoir where relative fluid movement is highlighted. Using such a distribution, zones with higher and lower permeability can be identified and used in a reservoir production plan. The thin zones of very high permeability can be identified as fractures and their conductivity can be calculated. Similarly, hydraulic boundaries can be mapped. This information can be used to optimize water injection strategies which help prevent early water breakthrough and maximize hydrocarbon recovery.

In one or more embodiments, seabed receivers may use tri-axial electric dipole and/or tri-axial magnetic dipole antennas. The size of these antennas is not limited by the borehole diameter and can be much larger than the corresponding antennas used in a borehole.

In a marine environment, multiple wells may be drilled from the same platform and it is common to have at least portions of some wells close to each other. The proximity of wells may make multi-well receiving possible by placing receiver arrays in multiple boreholes close enough to sense EM signal of comparable intensity. As the EM source is transported through the water body, exciting the medium, the earth response is measured downhole in multiple boreholes, through electric and/or magnetic field sensors oriented in the direction of the well trajectory as well as perpendicular to it. In some embodiments, methods may also include sea floor receivers, which may use electric and magnetic fields sensors oriented in all 3 directions (X, Y and Z). The multi-well measurements add extra data and help with the inversion process. In some embodiments, the MTB signal measured can be processed to create a higher resolved 3D EM property distribution of the space between the wells.

Some of the methods and processes described above, can be performed by a processor. The term "processor" should not be construed to limit the embodiments disclosed herein to any device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor, such as a processor configured to calculate a three-dimensional property distribution of a reservoir of interest from data received by the one or more borehole receivers and the one or more marine receivers.

The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively, or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this present disclosure. Accordingly, all such modifications are intended to be included within the scope of this disclosure as defined in the following claims. It is the express intention of the applicant not to invoke 35 U.S.C. § 112 (f) for any limitations of any of the claims herein, except for those in which the claim expressly uses the words 'means for' together with an associated function.

What is claimed is:

1. A method, comprising:
dispersing one or more borehole receivers in one or more boreholes;
distributing one or more marine receivers in marine water at a seabed;
immersing an electromagnetic source in the marine water above the seabed;
energizing the electromagnetic source to generate electromagnetic waves;
measuring one or more borehole signal measurements using the one or more borehole receivers, wherein the one or more borehole signal measurements comprise propagations of the electromagnetic waves received at respective borehole receivers;
measuring one or more seabed signal measurements using the one or more marine receivers, wherein the one or more seabed signal measurements comprise reflections of the electromagnetic waves from earth subsurface strata of the seabed received at respective marine receivers; and
determining, via a processor, a three-dimensional property distribution of a reservoir of interest by:
using the one or more seabed signal measurements to determine electromagnetic parameters of the earth subsurface strata intervening between the seabed and the reservoir of interest via a first inversion operation;
using the one or more borehole signal measurements and the electromagnetic parameters of the earth subsurface strata to generate inverted one or more borehole signal measurements via a second inversion operation; and
determining the three-dimensional property distribution of the reservoir of interest based on the inverted one or more borehole signal measurements.

2. The method of claim 1, further comprising:
designing a drilling operation or secondary recovery operation based on the three-dimensional property distribution.

3. The method of claim 1, wherein the three-dimensional property distribution comprises at least one of a three-dimensional electromagnetic property distribution, a three-dimensional resistivity distribution, a three-dimensional induced polarization, a three-dimensional anisotropy distribution, a three-dimensional saturation distribution, a three-dimensional fracture distribution, a three-dimensional permeability distribution, a three-dimensional pore pressure distribution, or a three-dimensional hydraulic boundary distribution.

4. The method of claim 1, wherein the one or more borehole receivers are permanently or semi-permanently installed in the one or more boreholes.

5. The method of claim 1, wherein the electromagnetic source is excited in a time domain or in a frequency domain.

6. The method of claim 3, wherein the three-dimensional property distribution is the three-dimensional saturation distribution and is used to infer a three-dimensional trapped fluids distribution.

7. The method of claim 1, wherein the three-dimensional property distribution is used to optimize a water injection strategy.

8. The method of claim 1, wherein the electromagnetic source is transported in the marine water in a dragging plane determined from using a pre-operation model.

9. The method of claim 1, wherein the reservoir of interest includes hazardous materials.

10. The method of claim 1, further comprising:
determining the three-dimensional property distribution at one or more-time points to establish a time lapse three-dimensional property distribution.

11. The method of claim 10, wherein the time lapse three-dimensional property distribution is used to infer a three-dimensional distribution selected from a three-dimensional relative permeability distribution or a three-dimensional fracture conductivity distribution.

12. An apparatus comprising:
a marine electromagnetic source immersed in marine water above a seabed, wherein the marine electromagnetic source is configured to generate electromagnetic waves;
one or more borehole receivers dispersed in one or more borehole locations to measure one or more borehole signal measurements, wherein the one or more borehole signal measurements comprise propagations of the electromagnetic waves received at respective borehole receivers;
one or more marine receivers dispersed in one or more seabed locations to measure one or more seabed signal measurements, wherein the one or more seabed signal measurements comprise reflections of the electromagnetic waves from earth subsurface strata of the seabed received at respective marine receivers; and
a processor configured to calculate a three-dimensional property distribution of a reservoir of interest by:
using the one or more seabed signal measurements to determine electromagnetic parameters of the earth subsurface strata intervening between the seabed and the reservoir of interest via a first inversion operation;
using the one or more borehole signal measurements and the electromagnetic parameters of the earth subsurface strata to generate inverted one or more borehole signal measurements via a second inversion operation; and
determining the three-dimensional property distribution of the reservoir of interest based on the inverted one or more borehole signal measurements.

13. The apparatus of claim 12, wherein the marine electromagnetic source is selected from a group comprising: one-dimensional electric dipole, two-dimensional electric dipole, three-dimensional electric dipole, one-dimensional magnetic dipole, two-dimensional magnetic dipole, and three-dimensional magnetic dipole.

14. The apparatus of claim 12, wherein the one or more borehole receivers comprise a combination of an electric dipole antenna and a magnetic dipole antenna.

15. The apparatus of claim 12, wherein the one or more marine receivers comprise a combination of a multi-dimensional electric dipole antenna and a multidimensional magnetic dipole antenna.

16. The apparatus of claim 12, wherein the marine electromagnetic source is electrically and mechanically connected to a marine vessel.

17. The apparatus of claim 16, wherein the marine vessel can excite and drag the marine electromagnetic source immersed in the marine water.

18. A method, comprising:
providing, from one or more borehole receivers in one or more boreholes, one or more borehole signal measurements with corresponding depths, wherein the one or more borehole signal measurements comprise propagations of electromagnetic waves generated by an electromagnetic source and received at respective borehole receivers, and wherein the electromagnetic source is immersed in marine water above a seabed and configured to generate the electromagnetic waves;

providing, from one or more marine receivers at the seabed, one or more seabed signal measurements with corresponding seabed coordinates, wherein the one or more seabed signal measurements comprise reflections of the electromagnetic waves from earth subsurface strata of the seabed received at respective marine receivers;

using the one or more seabed signal measurements to determine electromagnetic parameters of the earth subsurface strata intervening between the seabed and a reservoir of interest via a first inversion operation;

using the one or more borehole signal measurements and the electromagnetic parameters of the earth subsurface strata to generate inverted one or more borehole signal measurements via a second inversion operation; and determining, via a processor, a three-dimensional property distribution of the reservoir of interest from the inverted one or more borehole signal measurements.

19. The method of claim 18, further comprising:
designing a drilling operation or secondary recovery operation based on the three-dimensional property distribution.

20. The method of claim 18, wherein the inverting comprises a three-dimensional inversion.

21. The method of claim 18, wherein the three-dimensional property distribution comprises at least one of a three-dimensional electromagnetic property distribution, a three-dimensional resistivity distribution, a three-dimensional induced polarization, a three-dimensional anisotropy distribution, a three-dimensional saturation distribution, a three-dimensional fracture distribution, a three-dimensional permeability distribution, a three-dimensional pore pressure distribution, or a three-dimensional hydraulic boundary distribution.

22. The method of claim 21, wherein the three-dimensional saturation distribution is used to infer a three-dimensional trapped fluids distribution.

* * * * *